United States Patent [11] 3,607,396

[72] Inventors Felix Joseph Germino
  Palos Park;
  Van Deursen Harms, Homewood; Edwin Hans Christensen, La Grange Park, all of Ill.
[21] Appl. No. 745,107
[22] Filed July 16, 1968
[45] Patented Sept. 21, 1971
[73] Assignee CPC International Inc.

[54] PROCESS FOR TREATING GRANULAR STARCH MATERIALS
  6 Claims, No Drawings
[52] U.S. Cl. ........................................................ 127/71, 127/32, 127/38
[51] Int. Cl. ......................................................... C13l 1/08, C13l 1/06, C13l 1/00
[50] Field of Search............................................ 127/32, 38, 71; 260/233.3 A, 412.4, 412.8; 202/96

[56] References Cited
  UNITED STATES PATENTS
2,386,509  10/1945  Schoch .......................... 127/32
3,101,284  8/1963   Etheridge ...................... 127/32 X
3,105,778  10/1963  Anderson ...................... 127/32 X
3,424,613  1/1969   Huber et al. ................... 127/32 X
3,188,237  6/1965   Moshy et al. .................. 127/32
3,485,668  12/1969  Kunze ........................... 127/71

OTHER REFERENCES

Anderson et al., " Upgrading the Amylose Content of Amylomaize Starch by Butanol Complexing" Chem. Abs. 61:9658 (1964).

Primary Examiner—Morris O. Wolk
Assistant Examiner—D. G. Conlin
Attorneys—Frank E. Robbins, James L. Bailey, Janet E. Price, Robert D. Weist and Martha A. Michaels ABSTRACT: Process for subjecting granular starch material, on a continuous basis, to the combined action of a solvent for the starch material and liquid that is not a solvent for the starch material, under controlled conditions, including direct heating, so as to produce controlled amounts of desired change in the granular starch material. Exemplary applications are for the continuous production of granular preswollen starch, and texturized starch.

3,607,396

PROCESS FOR TREATING GRANULAR STARCH MATERIALS

This application relates to processes for treating a variety of granular starch materials, to effect desired changes in the physical and/or chemical characteristics of the materials.

Starch itself has been treated in many different ways, to modify its properties, to make resultant starch products that are useful for different applications. For example, there have been many attempts in the past to produce practical starch products having good solubility in cold water. Such products have not been entirely satisfactory, and in some cases, the processes have not been attractive for commercial manufacturing operations.

Because it is difficult to dissolve starch in water, starch is often put into solution, or gelatinized, by heating it in an aqueous suspension, usually at the time and place when and where it is to be used.

When the gelatinization threshold temperature of starch in water is reached, some of the starch granules swell and simultaneously lose their characteristic polarization crosses. Both actions appear to originate at the hilum or botanical center of the granule, and appear to progress to the granule periphery. The threshold temperature characteristically is not the same for all granules in a given suspension. Rather, swelling occurs over a range of temperatures. Moreover, the starch granule has a structure that can be characterized as an interconnected three-dimensional lattice. This lattice has a limited degree of elasticity, and a limited capacity for sorbing cold water and for swelling reversibly. It is therefore difficult to pretreat the starch to modify it, to make it more amenable to subsequent dissolution, without completely gelatinizing it in an irreversible manner. Recently, however, processes have been developed which will accomplish this desired result.

Such recently developed processes involve subjecting granular starch material to the combined action of a solvent (e.g. water) for the starch material and a liquid that is a nonsolvent (e.g. methanol) for the starch material. Such processes are applicable to the continuous preparation of defatted starch, granular preswollen starch, texturized starch, and the like. These processes are referred to hereinafter as "solvent-treated-starch" processes.

As heretofore practiced, solvent-treated-starch processes have employed reactors which indirectly heat the granular starch material. For example, one such process, for the preparation of granular preswollen starch, uses a steam-jacketed tubular reactor, to supply heat, under controlled conditions, to a slurry of granular starch in aqueous methanol. Although solvent-treated-starch processes employing indirect heating have provided the art with a very useful means for treating a variety of starch materials to provide desired changes in such materials, including novel starch products, there are certain limitations which are inherent in processes employing indirect heating.

It is an object of the present invention to provide improvements in solvent-treated-starch processes.

Another object of the invention is to provide an improved process for the continuous treatment of granular starch materials.

A further object of the invention is to provide a practical, continuous process for preparing granular cold-water-swelling starch.

A more specific object of the invention is to provide means for processing relatively high starch solids levels.

Other objects of the present invention will be apparent from the following disclosure and the appended claims.

Granular starch that is processed, in accordance with the present invention, may be derived from any vegetable source, such as, for example, corn, potato, wheat, tapioca, rice, sago, and grain sorghum, and the waxy starches may also be used. The term "starch" is used broadly herein, and encompasses unmodified starch and tailings, and, as well, starch that has been modified by treatment with acids, alkalies, enzymes, or oxidizing agents. Soluble or partially soluble modified starches, dextrins, pregelatinized products, and starch derivatives are also amenable to treatment by the process of the present invention. For example, cationic corn starch and hydroxyethyl sorghum starch can be treated by the process of the present invention, as can crossbonded starch produced by treatment of starch with such materials, for example, as sodium trimetaphosphate, epichlorohydrin, phosphorus oxychloride, formaldehyde, and other polyfunctional reagents.

The term "starch material" is used herein to encompass not only starch but also the other materials mentioned above, and the like, that are susceptible to treatment by the process of the present invention.

The process of the invention is particularly useful in the production of products such as, for example, granular preswollen starch and texturized starch.

Granular preswollen starch is a cold-water-swelling starch with intact granules. When produced under preferred optimum conditions, granular preswollen starch will be free of birefringent granules, will exhibit little or no granule fragmentation, and will produce a high cold water viscosity. It is useful as a quickly soluble thickener in making such food items, for example, as puddings, gravies, and soups.

Texturized starch is a cold-water-swellable, nonbirefringent, substantially completely fragmented starch. When slurried in water at a solids content of as little as 5 percent, the product exhibits texturizing characteristics by yielding a pulpy mixture. Texturized starch is useful in preparing food products such as, for example, applesauce, spaghetti sauce and the like.

In its broad aspects, the process of the invention is a continuous process for subjecting a slurry of starch material to direct heat under carefully controlled conditions. In the slurry, the starch material is suspended in a liquid medium comprising a solvent for the starch material and a liquid that is not a solvent for the starch material. The process preferably involves subjecting the slurry stream, under controlled conditions, to direct steam injection. The final steps involve discharging the slurry stream from the reaction zone, and rapidly cooling the slurry stream to terminate the treatment of the starch material.

As used herein, the phrase "solvent for starch" is used to mean any liquid in which starch will dissolve, or gelatinize. The most commonly used and most economical solvent for starch is, of course, water, and this is the preferred solvent. Other common solvents, however, such as dimethyl sulfoxide, dimethyl formamide, N-methyl pyrrolidone, or 2-amino ethanol, are just as suitable, albeit less economical, in the practice of the invention. In the following discussion, this liquid will be referred to as the "solvent."

The second liquid component of the slurry can be any organic liquid which is miscible with the solvent for starch and which is not itself a solvent for starch. Of the starch is to be used as an ingredient in food, then obviously substantially all of the organic liquid must be removed from the starch after treatment; for this reason it is desirable to use a liquid which is not excessively retained within the starch granules. It is also desirable, for economic reasons, to select a liquid which can be readily recovered from the solvent for reuse. Lower alcohols (e.g. methanol, ethanol, isopropanol, tertiary butanol), ketones (e.g. acetone, methyl ethyl ketone), dioxane, etc. are particularly suitable in the practice of the invention. In the following discussion, this component will be referred to as the "organic liquid."

The essence of the present invention is the discovery that, by subjecting a slurry of starch material to direct (as opposed to indirect) heating in the previously described liquid medium (i.e., solvent plus organic liquid), the process can be so controlled as to permit the preparation of products of desired characteristics, while process advantages unattainable with indirect heating are realized.

One important process advantage afforded by direct heating is the relatively high, i.e. in excess of 25 percent, starch solids levels that can be used. In addition, direct heating provides a substantially instantaneous process and significantly reduces equipment requirements inherent in indirect heating processes.

To practice the process of the invention, the slurry is passed through a direct heater, preferably a steam injection heater, in which the slurry is subjected to gelatinizing conditions. By the term "gelatinizing conditions" is meant the type of conditions which would be necessary to gelatinize the starch material in the particular starch solvent being used. For example, if water is the solvent, steam is introduced directly into the slurry to achieve the desired degree of birefringence loss.

After the direct heating, the slurry is rapidly cooled and the granular starch material is recovered from the liquid phase of the cooled slurry, as by filtration, and dried. With most liquid systems it is desirable to add excess organic liquid to the slurry, thereby reducing the overall solvent content, prior to recovering the starch from the slurry. The low proportionate water content effects a deswelling of the granules, by releasing a part of the imbibed water. This step is particularly important when water is used as the solvent for the following reasons: (1) it greatly facilitates filtration of the starch material from the slurry, and (2) unless the water content is reduced, if the processed starch material is dried with the application of heat, a "horny" product results.

The proper process conditions are dependent upon the particular liquid medium being employed, the particular starch material being treated, and the characteristics desired in the end product. These conditions can readily be ascertained, and the following discussion and examples will guide persons skilled in the art in selecting the conditions necessary for any particular system and product. The discussion and examples set forth data on our preferred system, i.e. corn starch, water and methanol. From this disclosure, persons skilled in the art will easily be able to select optimum conditions for any desired system. Throughout this disclosure, all parts and percentages are by weight, unless expressly stated otherwise.

GRANULAR PRESWOLLEN STARCH

The process of the invention will now be described as applied to the production of granular preswollen starch.

The many varieties and types of starch already mentioned, that are amenable to processing in accordance with the present invention, can be employed for the production of granular preswollen starch. The waxy starches of corn, grain sorghum and rice, with their high-swelling, tender granules, tend to be more difficult than other starches to maintain in granule form during treatment in solvent-treated-starch processes. However, the process of the present invention is much more satisfactory for use with such fragile starches, than are prior art processes which employ indirect heating. Moreover, such fragile starches, when stabilized by chemical cross linking, are especially suitable for treatment. The high amylose starches of maize, that are exceedingly difficult to gelatinize in water, can easily be pregelatinized in accordance with the present invention, perhaps because of the high temperature that can be employed. In addition, starches that are thinned in the granule state with acids or oxidizing agents, for example, perform similarly to their respective parent starches. Common starches that have been mildly derivatized may also be processed. On the other hand, starches that have a high degree of derivatization can be processed more easily after cross linking.

EXAMPLE I

Granular Preswollen Starch Prepared by Direct Heating in a Methanol-Water Slurry A granular preswollen starch was obtained by passing a starch material-methanol-water slurry, of a composition described hereinafter, through a direct steam injection heater (cooker), under the conditions indicated.

The starch material employed in this example was a thick-boiling corn starch, having a moisture content of about 12 wt. percent. The slurry contained 35 wt. percent starch solids (dry basis). The balance (i.e. the other 65 wt. percent) of the slurry was a liquid medium comprising 20 wt. percent water and 80 wt. percent methanol. A stream of this slurry was continuously supplied to the heater, at a flow rate of about 2.5 gallons per minute. Steam was introduced into the heater to maintain the heater at a temperature of about 265° F.

Conventional steam injection heaters, known in art, and sometimes referred to as continuous starch cookers or pasters, are suitable for use in the present invention.

The heater used in this example comprised a block provided with a plenum chamber which had one inlet for the slurry stream, one inlet for the steam, and one outlet for product discharge. The slurry stream and the steam are introduced tangentially in the same plane at relatively high velocities into the plenum chamber where intimate contact and uniform heating results. The heated slurry was immediately discharged from the heater through a suitable orifice into agitated dilution methanol. About 10 parts of dilution methanol per seven parts of heated slurry was used. Thus, the direct heating is a substantially instantaneous process. The product was recovered by filtration and drying.

The product recovered had highly desirable properties. The product comprised swollen, substantially intact starch granules, and produced a paste of approximately 50 poise Brookfield viscosity, at a starch concentration of 7.5 percent when reconstituted in water at 25° C. (2 hours age). The paste exhibited excellent shear stability having no loss in viscosity after shearing at a constant force at 1,800 r.p.m. for 20 minutes.

This example also indicates that relatively high (e.g. about 35 percent starch solids levels can be processed substantially instantaneously, using relatively simple equipment. In contrast, when indirect heating is employed, although satisfactory products can be produced, operating difficulties are frequently encountered. For example, when processing starch solids levels in excess of about 25 percent, using an indirect continuous heat exchanger, e.g. a Votator, plugging is frequently a problem. In addition, this latter process requires relatively higher processing temperatures and more elaborate equipment.

Granular Preswollen Starch—General Considerations

The continuous preparation of granular preswollen starch, in accordance with the present invention, involves subjecting the slurry to gelatinizing conditions while minimizing granule fragmentation, so that the product exhibits little or no granule fragmentation.

Generally, the composition of the slurry, for such an application of the process, will be similar to the composition employed in other applications of the process. For example, the slurry will usually contain at least about 25 percent starch solids, (dry basis) and may contain as much as about 40 percent. Typically the slurry will contain about 35 percent starch solids. The balance of the slurry will comprise the liquid medium which generally comprises about 10 percent to about 55 percent starch solvent, such as water, and about 45 percent to about 90 percent organic liquid such as methanol. Preferably, the liquid medium will comprise about 20 percent to about 30 percent water and about 70 percent to about 80 percent methanol.

In the direct heater, the slurry should be heated to a temperature of about 195° F. to about 330° F.; preferably about 220° F. to about 280° F. This is preferably accomplished by direct injection of steam in a manner such that the slurry is substantially instantaneously heated. During the direct heating the steam is condensed. A After direct heating, the heated slurry is diluted with an additional amount of the organic liquid. While this dilution has the effect of cooling the slurry, it has the additional effect of releasing any liquid that has been imbibed by the granules of starch material. The dilution step is accomplished, in accordance with one preferred mode, by adding with agitation an additional quantity of the organic liquid, such as, for example, methanol. A ratio of about 10 parts methanol per seven parts heated slurry can be used. A larger proportion of methanol may facilitate handling.

TEXTURIZED STARCH

The process of the invention will now be illustrated as applied to the production of texturized starch.

EXAMPLE II

A texturized starch was obtained by passing a starch material-methanol-water slurry, of a composition described hereinafter, through a direct steam injection heater of the type used in example 1, under the conditions indicated hereafter.

The starch material employed in this example was a crossbonded corn starch. The slurry contained 35 wt. percent starch solids. The balance of the slurry was a liquid medium comprising 30 wt. percent water and 70 wt. percent methanol. A stream of this slurry was continuously supplied to the heater, at a flow rate of about 2.5 gallons per minute. Steam was introduced into the heater to maintain the heater at a temperature of about 275° F. The heated slurry was discharged into dilution methanol and the product recovered.

The product recovered had highly desirable properties and the process afforded the same advantages illustrated in example 1. When the product was added to tomato juice at a 5 wt. percent level, and then heated under retort conditions of 240° F. for 10 minutes, a thick, pulpy sauce resembling a natural paste was obtained.

GENERAL CONSIDERATIONS

Many variations in the process parameters are possible within the scope of the invention. The examples herein are illustrative only.

Thus, the process conditions may be mild or extreme, depending upon the results sought, the properties desired in the final product, the equipment limitations, and the like. The two kinds of products that are described herein demonstrate the versatility of the process, but other very desirable products may also be produced.

Some of the limitations on the process are imposed by purely practical considerations. For example, the slurry generally should contain at least 25 percent starch material (dry basis) to make the process economically attractive. An upper limit of approximately 40 percent of the starch material represents the highest concentration of starch that can be handled readily. Similarly, the time of exposure of the starch material to the maximum treatment temperature preferably is as short as possible, consistent with the achievement of the desired results.

Moreover, while direct steam injection is the preferred and illustrated method of effecting the direct heating, other methods, such as the direct injection of organic vapors, e.g. methanol vapor may be used, and such methods are within the scope of the present invention.

While the invention has been disclosed herein by reference to the details of preferred embodiments thereof, then, it is to be understood that such disclosure is intended in an illustrative rather than in a limiting sense, and it is contemplated that various modifications in the process and the equipment will readily occur to those skilled in the art, within the spirit of the invention and the scope of the appended claims.

We Claim:

1. A continuous process for the preparation of a granular preswollen starch or a texturized starch wherein a slurry of starch material in a liquid medium comprising from about 10 percent to about 30 percent of a solvent for the starch material and from about 70 percent to about 90 percent of an organic liquid that is not a solvent for the starch material but that is miscible with said solvent selected from the group consisting of lower alcohols, acetone, methyl ethyl ketone and dioxane is directly heated with steam to a temperature of from about 195° F. to about 330° F. and the heated slurry is subsequently, rapidly cooled.

2. A process for the preparation of a granular preswollen starch or a texturized starch wherein a slurry of starch material in a liquid medium which comprises from about 10 percent to about 30 percent of a solvent for the starch material and at least about 70 percent methanol is directly heated with steam to a temperature of from about 195° F. to about 330° F. and the heated slurry is subsequently, rapidly cooled.

3. A process as defined by claim 2 wherein said liquid medium comprises about 80 percent methanol.

4. A process for the preparation of a granular preswollen starch or a texturized starch wherein a slurry of starch material in a liquid medium comprising from about 10 percent to about 55 percent of a solvent for the starch material and from about 45 percent to about 90 percent of an organic liquid that is not a solvent for the starch material but that is miscible with said solvent selected from the group consisting of lower alcohols, acetone, methyl ethyl ketone and dioxane is directly heated with steam to a temperature of from about 195° F. to about 330° F. and the heated slurry is subsequently, rapidly cooled by discharging said heated slurry into a pool of methanol.

5. A process of preparing a granular preswollen starch comprising preparing a slurry consisting of 35 wt. percent, on a dry basis, of corn starch, 13 wt. percent water, and 52 wt. percent methanol. continuously supplying a stream of said slurry to a direct heater; continuously, intimately, directly contacting said slurry in said heater with steam, to maintain said heater at a temperature of about 265° F, continuously discharging from said heater a stream of heated slurry into dilution methanol, and recovering a granular preswollen starch product.

6. A continuous process for the production of a granular preswollen starch or a texturized starch wherein a slurry of starch material in a liquid medium comprising from about 10 percent to about 30 percent of a solvent for the starch material and from about 70 percent to about 90 percent of an organic liquid that is not a solvent for the starch material but that is miscible with said solvent selected from the group consisting of lower alcohols, acetone, methyl ethyl ketone and dioxane is directly heated with the vapor of said organic liquid to a temperature of from about 195° F. to about 330° F. and the heated slurry is subsequently, rapidly cooled.